(12) United States Patent
Fedeli et al.

(10) Patent No.: US 9,733,430 B2
(45) Date of Patent: Aug. 15, 2017

(54) OPTICAL WAVEGUIDE MANUFACTURING METHOD

(71) Applicant: COMMISSARIAT À L'ENERGIE ATOMIQUE ET AUX ENERGIES ALTERNATIVES, Paris (FR)

(72) Inventors: Jean-Marc Fedeli, Saint-Egrève (FR); Alexis Abraham, Echirolles (FR); Ségoléne Olivier, Saint Martin le Vinoux (FR); Yann Bogumilowicz, Grenoble (FR); Thomas Magis, Grenoble (FR); Pierre Brianceau, Biviers (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/823,324

(22) Filed: Aug. 11, 2015

(65) Prior Publication Data
US 2016/0041339 A1 Feb. 11, 2016

(30) Foreign Application Priority Data
Aug. 11, 2014 (FR) ..................... 14 57748

(51) Int. Cl.
*G02B 6/13* (2006.01)
*G02B 6/136* (2006.01)
(Continued)

(52) U.S. Cl.
CPC ............. *G02B 6/131* (2013.01); *G02B 6/107* (2013.01); *G02B 6/136* (2013.01); *G02F 1/025* (2013.01);
(Continued)

(58) Field of Classification Search
CPC ........ G02B 6/131; G02B 6/107; G02B 6/132; G02B 6/134; G02B 6/136;
(Continued)

(56) References Cited

U.S. PATENT DOCUMENTS

| 7,972,522 B2* | 7/2011 | Jordana | .................. B82Y 20/00 216/17 |
| 8,252,670 B2* | 8/2012 | Fedeli | .................. G02B 6/1347 257/E21.334 |

(Continued)

FOREIGN PATENT DOCUMENTS

| EP | 2463695 A1 | 6/2012 |
| FR | 2907916 A1 | 5/2008 |

OTHER PUBLICATIONS

Layadi, N. et al., "Plasma Etching in Microelectronics," p. 20-21, 2001.

(Continued)

Primary Examiner — John M Bedtelyon
(74) Attorney, Agent, or Firm — Oliff PLC

(57) ABSTRACT

A method of manufacturing an optical waveguide with a vertical slot including the steps of a) providing a substrate successively including an electric insulator layer and a crystalline semiconductor layer, b) forming a trench on the semiconductor layer to expose the electric insulator layer and defining first and second semiconductor areas on either side, step b) being executed so that the first semiconductor area has a lateral edge extending across the entire thickness of the semiconductor layer, c) forming the dielectric layer having the predetermined width across the entire thickness of the lateral edge, the method being remarkable in that the trench formed at step b) is configured so that the second semiconductor area forms a seed layer.

16 Claims, 2 Drawing Sheets

(51) Int. Cl.
*G02B 6/10* (2006.01)
*G02B 6/12* (2006.01)
*G02F 1/025* (2006.01)
*B82Y 20/00* (2011.01)

(52) U.S. Cl.
CPC ..... *B82Y 20/00* (2013.01); *G02B 2006/12061* (2013.01); *G02B 2006/12142* (2013.01)

(58) Field of Classification Search
CPC ........... G02B 2006/12061; G02B 2006/12142; H01L 21/02365; G02F 1/025
See application file for complete search history.

(56) References Cited

U.S. PATENT DOCUMENTS

| | | | |
|---|---|---|---|
| 8,415,185 B2* | 4/2013 | Fedeli | B82Y 20/00 257/E45.005 |
| 9,103,974 B2* | 8/2015 | Kang | G02B 6/124 |
| 2010/0310208 A1* | 12/2010 | Wang | B82Y 20/00 385/14 |

OTHER PUBLICATIONS

Spott, Alexander et al., "Photolithographic Fabrication of Slot Waveguides," Proc. of SPIE, vol. 7927, pp. 792704-1 to 792704-6.
Xu, Qianfan et al., "Experimental Demonstration of Guiding and Confining Light in Nanometer-size Low-Refractive-Index Material," Optics Letters, vol. 29, No. 14, Jul. 15, 2004, pp. 1626-1628.

\* cited by examiner

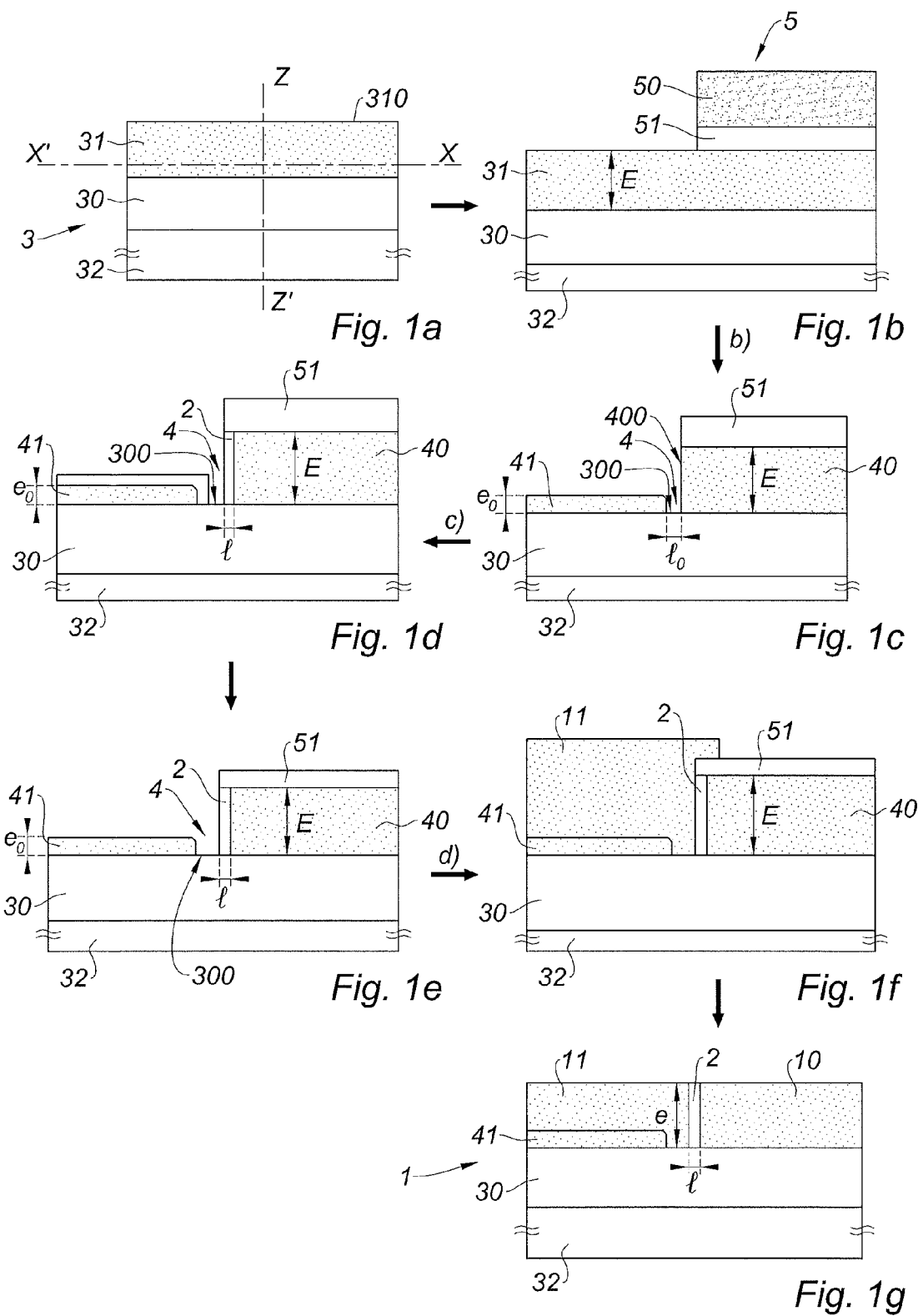

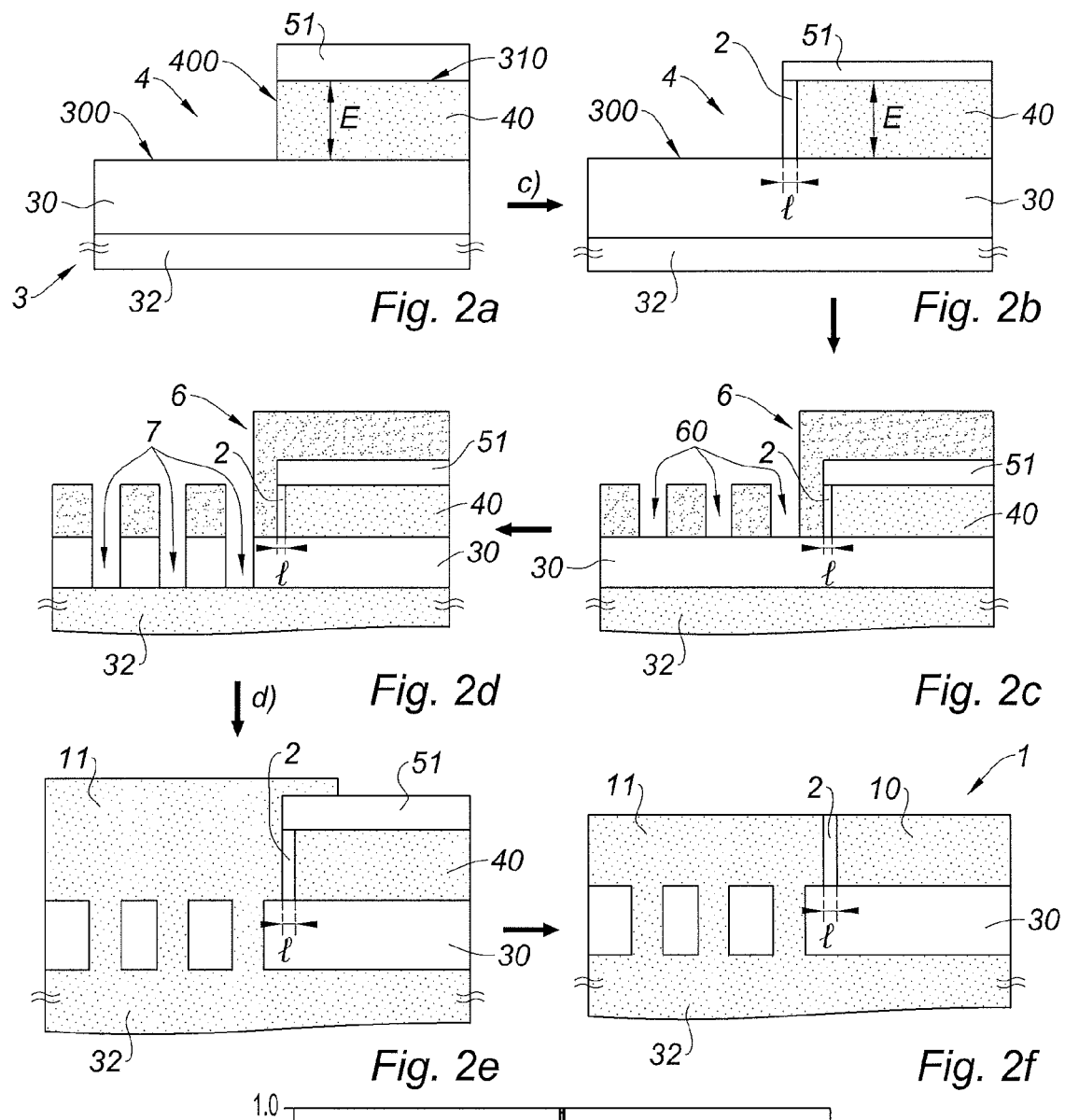

OPTICAL WAVEGUIDE MANUFACTURING METHOD

The present invention relates to an optical waveguide manufacturing method, to an optical waveguide capable of being obtained by a method according to the invention, to an optical waveguide, as well as to an electro-optical modulator comprising an optical waveguide according to the invention.

More particularly, the invention relates to the field of vertical slot waveguides used, in particular, for electro-optical modulators of capacitive type. Such optical waveguides may also be used, in particular, as optical switches, light sources, or optical sensors.

Thus, the optical waveguide comprises two crystalline semiconductor regions separated by a dielectric layer, the dielectric layer having a predetermined width and a predetermined thickness strictly greater than said width.

The dielectric layer forms the vertical slot. The two crystalline semiconductor regions may be electrically doped and form a capacitance with the dielectric layer. When the two semiconductor regions are submitted to a potential difference, the charge carriers accumulate at the interfaces between the dielectric layer and the semiconductor regions. Such a charge carrier concentration variation may lead to an electro-refraction phenomenon, that is, the refractive index of the semiconductor layers locally varies according to the potential difference of the applied electric field. The optical field is essentially confined in the dielectric layer, which enables to decrease optical losses. Such a variation of the refractive index of the semiconductor layers enables to introduce a phase shift for an electromagnetic wave propagating through the semiconductor regions. For electro-optical modulators, an interferometric structure is associated with the optical waveguide to obtain an intensity modulation from the introduced phase shift. The interferometric structure may be a Mach-Zehnder, Fabry-Perot, or ring-type interferometer.

A first optical waveguide manufacturing method known in the state of the art, particularly from document FR 2 907 916, is a method of manufacturing an optical waveguide comprising two crystal semiconductor regions separated by a dielectric layer, the dielectric layer having a predetermined width and a predetermined thickness strictly greater than said width, the method comprising the steps of: a) providing a substrate successively comprising an electric insulator layer and a crystal semiconductor layer, the substrate having a planar surface, b) forming a trench in the semiconductor layer to expose the electric insulator layer and define first and second semiconductor areas on either side of the exposed electric insulator layer, step b) being executed so that the first semiconductor area has a lateral edge extending across the entire thickness of the semiconductor layer and along an axis perpendicular to the planar surface of the substrate, the first semiconductor area being intended to form the first semiconductor region of the optical waveguide, c) forming the dielectric layer with the predetermined width across the entire thickness of the lateral edge.

"Width" means a dimension along an axis parallel to the plane defined by the planar surface of the substrate.

"Thickness" means a dimension along an axis perpendicular to the planar surface of the substrate.

"Crystalline" means an area or a region where the atoms or molecules are arranged regularly according to a characteristic pattern, which thus excludes amorphous areas or regions.

"Perpendicular" means that the angle formed between the lateral edge and the planar surface of the substrate is in the range from 85° to 95°.

The trench formed at step b) is configured to have a constant width equal to the predetermined width of the dielectric layer. The exposed electric insulator layer thus has a width equal to the predetermined length of the dielectric layer.

Step c) is executed by plasma-enhanced chemical vapor deposition.

This first method is not fully satisfactory since the dielectric layer formed during step c) may comprise a bubble as soon as the ratio of the thickness to the width of the dielectric layer is greater than 1.5, as specified on page 3, lines 22 to 28. This bubble is highly prejudicial to the optical waveguide performance, as specified on page 3, lines 29 to 31. Further, when said ratio is much higher than 1.5, for example, from 5 to 10, it is impossible to form the dielectric layer due to a lack of filling, as specified on page 4, lines 2 to 5. Further, trench-forming step b) should be perfectly controlled, since it determines the width of the dielectric layer.

A second optical waveguide manufacturing method known in the state of the art, particularly from document EP 2,463,695, is a method of manufacturing an optical waveguide comprising two crystal semiconductor regions separated by a dielectric layer, the dielectric layer having a predetermined width and a predetermined thickness greater than said width, the method comprising the steps of: a) providing a substrate successively comprising an electric insulator layer and a crystalline semiconductor layer, the substrate having a planar surface, b) forming a trench in the semiconductor layer to expose the electric insulator layer and define first and second semiconductor areas on either side of the exposed electric insulator layer.

Step b) is followed by a step of depositing a dielectric material on the exposed electric insulator layer, the deposited dielectric material having a thickness equal to the predetermined thickness of the dielectric layer. The deposited dielectric layer is then etched to only keep a slot of the predetermined width, the slot forming the dielectric layer of the optical waveguide.

This second method is not fully satisfactory since the obtaining of a thin slot (from 30 to 50 nm) requires a plurality of etchings of the dielectric material, as specified on §0027, which makes the second method complex to implement, with a lengthened operating time. Further, the cleaning steps after said etchings result in a sub-optimal control of uniformity of the slot thickness, whereby the second method is not perfectly reproducible.

The present invention aims at overcoming all or part of the above-mentioned disadvantages, and relates, for this purpose, to a method of manufacturing an optical waveguide comprising two crystalline semiconductor regions separated by a dielectric layer, the dielectric layer having a predetermined width and a predetermined thickness greater than said width, the method comprising the steps of: a) providing a substrate successively comprising an electric insulator layer and a crystalline semiconductor layer, the substrate having a planar surface, b) forming a trench in the semiconductor layer to expose the electric insulator layer and define first and second semiconductor areas on either side of the exposed electric insulator layer, step b) being executed so that the first semiconductor area has a lateral edge extending across the entire thickness of the semiconductor layer and along an axis perpendicular to the planar surface of the substrate, the first semiconductor area being intended to form the first semiconductor region of the optical waveguide, c) forming the dielectric layer with the predetermined width across the entire thickness of the lateral edge, the method being remarkable in that the trench formed at step b) is configured so that the second semiconductor area forms a seed layer extending across a thickness smaller than the thickness of the semiconductor layer, and in that it comprises a step d) of forming by epitaxy the second semiconductor region of the optical waveguide from the seed layer, step d) being executed after step c).

"Width" means a dimension along an axis parallel to the plane defined by the planar surface of the substrate.

"Thickness" means a dimension along an axis perpendicular to the planar surface of the substrate.

"Crystalline" means an area or a region where the atoms or molecules are arranged regularly according to a characteristic pattern, which thus excludes amorphous areas or regions.

"Perpendicular" means that the angle formed between the lateral edge and the planar surface of the substrate is in the range from 85° to 95°.

"Seed layer" means a thin layer forming an epitaxial growth support for a crystalline material.

Thus, such a method according to the invention enables to avoid the forming of a bubble inside of the dielectric layer due to a sufficiently large width of the exposed electric insulator layer as compared with the thickness of the seed layer.

Further, the width of the dielectric layer is totally determined at step c) in the absence of a geometric constraint due to a sufficiently small thickness of the seed layer. The width of the dielectric layer is thus not determined by the width of the electric insulator layer exposed during step b). The width of the exposed electric insulator layer thus is an adjustment variable relatively to the desired thickness of the seed layer, to avoid the forming of a bubble inside of the dielectric layer. It is then possible to envisage the forming of dielectric layer having a thickness-to-width ratio much larger than 1.5, for example, in the range from 17 to 50, preferably in the range from 20 to 50, more preferably in the range from 20 to 30.

Step d) should be executed after step c) to avoid the forming of a bubble inside of the dielectric layer, and this, due to geometric constraints appearing with the thickness of the epitaxial layer.

Further, in the absence of successive dielectric material etching and cleaning steps, such a method according to the invention enables to obtain a good uniformity of the thickness and of the width of the dielectric layer, and this, with a decreased operating time.

The present invention also aims at a method of manufacturing an optical waveguide comprising two crystalline semiconductor regions separated by a dielectric layer, the dielectric layer having a predetermined width and a predetermined thickness greater than said width, the method comprising the steps of: a) providing a substrate successively comprising an electric insulator layer and a crystalline semiconductor layer, the substrate having a planar surface, the surface being based on a crystalline semiconductor material, b) removing a portion of the semiconductor layer to expose the electric insulator layer and define a single semiconductor area on one side of the exposed electric insulator layer, step b) being executed so that the semiconductor area has a lateral edge extending across the entire thickness of the semiconductor layer and along an axis perpendicular to the planar surface of the substrate, the semiconductor area being intended to form the first semiconductor region of the optical waveguide, c) forming the dielectric layer with the predetermined width across the entire thickness of the lateral edge, c1) forming at least one trench in the exposed electric insulator layer to expose the substrate, d) forming by epitaxy the second semiconductor region of the optical waveguide from the exposed substrate, step d) being executed after step c).

"Width" means a dimension along an axis parallel to the plane defined by the planar surface of the substrate.

"Thickness" means a dimension along an axis perpendicular to the planar surface of the substrate.

"Crystalline" means an area or a region where the atoms or molecules are arranged regularly according to a characteristic pattern, which thus excludes amorphous areas or regions.

"Perpendicular" means that the angle formed between the lateral edge and the planar surface of the substrate is in the range from 85° to 95°.

Thus, such a method according to the invention enables to avoid the forming of a bubble inside of the dielectric layer since the dielectric layer is formed at step c) in the absence of a semiconductor area opposite the single semiconductor area defined at step b). More specifically, there is no semiconductor area opposite the single semiconductor area along the width of the optical waveguide.

Further, the width of the dielectric layer is totally determined at step c) in the absence of a geometric constraint due to the absence of a semiconductor area opposite the single semiconductor area defined at step b). It is then possible to envisage the forming of dielectric layer having a thickness-to-width ratio much larger than 1.5, for example, in the range from 17 to 50, preferably in the range from 20 to 50, more preferably in the range from 20 to 30.

Further, in the absence of successive dielectric material etching and cleaning steps, such a method according to the invention enables to obtain a uniformity of the thickness and of the width of the dielectric layer, and this, with a decreased operating time.

It should be noted that steps c) and c1) may be indifferently exchanged. However, step d) should be executed after step c) to avoid the forming of a bubble inside of the dielectric layer, and this, due to geometric constraints appearing with the thickness of the epitaxial layer.

The common inventive concept between the two methods according to the invention is the forming of the dielectric layer during step c) in the absence of geometric constraints, either due to a sufficiently small thickness of the seed layer, or due to the absence of an opposite semiconductor area along the width of the optical waveguide. Such a concept enables to envisage a thickness-to-width ratio of the dielectric layer much larger than 1.5. Further, in the absence of successive dielectric material etching and cleaning steps, such a concept enables to obtain a uniformity of the thickness and of the width of the dielectric layer, and this, with a decreased operating time.

According to an embodiment, step b) is executed by an etching of the semiconductor layer capable of forming the seed layer and a portion of the lateral edge of the first semiconductor area, said etching comprising an overetching of the semiconductor layer capable of exposing the electric insulator layer and defining the seed layer of the first semiconductor area, the overetching ending the forming of the lateral edge of the first semiconductor area.

According to an embodiment, the etching of the semiconductor layer is a reactive ion etching capable of favoring an anisotropic etching, the overetching of the semiconductor layer being obtained by an oblique incidence of an ion flow.

"Favoring" means that the parameters of the reactive ion etching such as pressure, power, temperature and bias voltage are selected to give priority to anisotropic plasma etching over isotropic dry chemical etching. For example, a low bias voltage, a high pressure and temperature, enable to favor dry chemical etching. Conversely, a high bias voltage, a low pressure, enable to favor a plasma etching by favoring mechanical ion bombarding. It will be within the abilities of those skilled in the art to appreciate terms "high" and "low", particularly according to the material to be etched and to the reactive gases selected for the plasma.

Noting Z'-Z the axis perpendicular to the planar surface of the substrate, "oblique" means a direction which is not parallel to axis Z'-Z.

Thus, the selection of a reactive ion etching enables to execute step b) within a single frame. Further, the obtained overetching forms a trench, and is known as "trenching", for example described in "Plasma Etching in Microelectronics", N. Layadi et al., 2001. The topography of the etched object results in an oblique incidence of an ion flow on an area of the lateral edge of the first semiconductor area and/or on an area of the side of the etching mask. The area of the lateral edge of the first semiconductor area and/or the area of the side of the etch mask deviates the incident ion flow. This results in a concentration of the ion flow appearing at the foot of the lateral edge of the first semiconductor area.

According to an embodiment, step b) is executed by anisotropic etching, such as a reactive ion etching, capable of forming the lateral edge of the semiconductor area.

According to an embodiment, step c) is executed by a thermal oxidation of the lateral edge.

Thus, the thermal oxidation enables to control the width of the dielectric layer formed on the thickness of the lateral edge. Further, the thermal oxidation consumes the crystalline material extending from the lateral edge. As a result, the thermal oxidation requires no particular constraint as to the width of the electric insulator layer exposed at step b). Thus, the width of the electric insulator layer exposed at step c) may be smaller than the predetermined width of the dielectric layer. However, the thermal oxidation also consumes the crystalline material of the seed layer. It is thus necessary to provide at step b) a sufficient thickness for the seed layer so that the thickness of the seed layer after step c) is sufficient for an epitaxial growth.

According to an alternative implementation, step c) is executed by conformal deposition of the dielectric layer on the lateral edge, preferably by atomic layer deposition or by plasma-enhanced chemical vapor deposition. Preferably, the thickness of the seed layer is smaller than 1.5 time the width of the exposed electric insulator layer.

"Conformal" means that the formed dielectric layer keeps the topography of the surface having said dielectric layer deposited thereon.

In the case of a conformal deposition, the crystalline material extending from the lateral edge is not consumed. The width of the electric insulator layer exposed at step c) should be greater than the predetermined width of the dielectric layer.

The additional geometric condition relative to the thickness of the seed layer enables to avoid the forming of a bubble inside of the dielectric layer for certain types of conformal deposition.

According to an embodiment, step d) comprises a chem.-mech. polishing step capable of making the second semiconductor region coplanar with the dielectric layer and with the first semiconductor region.

According to an embodiment, the semiconductor layer is a single-crystal layer, preferably based on single-crystal silicon.

Thus, the single-crystal structure of the semiconductor layer enables to decrease the optical losses relatively to a polycrystalline structure, for example.

According to an embodiment, the semiconductor layer has a thickness equal to the predetermined thickness of the dielectric layer.

Thus, a step of etching the dielectric layer is avoided after the forming of the dielectric layer on the lateral edge at step c). Further, a step of epitaxy of the first semiconductor region is also avoided.

According to an embodiment, the method comprises a step of electrically doping the first and second semiconductor regions so that the optical waveguide forms a capacitance.

Thus, such an optical waveguide is particularly adapted to an electro-optical modulator of capacitive type.

According to an embodiment, the ratio of the thickness to the width of the dielectric layer formed at step c) is greater than 1.5.

The present invention also relates to an optical waveguide capable of being obtained by a method according to the invention when the ratio of the thickness to the width of the dielectric layer formed at step c) is greater than 1.5.

Thus, such an optical waveguide differs from the state of the art by a uniform and controllable width of the dielectric layer, and this, for an industrial scale production.

The present invention also relates to an optical waveguide for an electro-optical modulator of capacitive type, comprising two electrically-doped crystalline semiconductor regions separated by a dielectric layer, the dielectric layer having a predetermined width and a predetermined thickness greater than said width, the width being smaller than or equal to 50 nm and greater than or equal to 4 nm, the optical waveguide being remarkable in that the thickness-to-width ratio is in the range from 17 to 50, preferably from 20 to 50, preferably still from 20 to 30.

Thus, the following advantages can be noted:
such thickness-to-width ratios of the dielectric layer allow a strong confinement of the optical field in the dielectric layer, and thereby a decrease in optical losses, while keeping a bandwidth acceptable for various applications,
such a range of widths of the dielectric layer enables to obtain a narrow charge carrier storage area, the storage area typically having a width in the order of 10 nm.

Now, the applicant has surprisingly observed that, despite the strong confinement of the optical field in the dielectric layer, the overlapping of the small fraction of the optical field present close to the dielectric layer with the charge carrier storage area remains sufficient to ensure the electro-refraction phenomenon.

Advantageously, the width of the dielectric layer is in the range from 4 nm to 20 nm.

Thus, such a range is appropriate to obtain a charge carrier storage area having a width in the order of 10 nm or less.

The present invention finally relates to an electro-optical modulator comprising an optical waveguide according to the invention.

The foregoing and other features and advantages will be discussed in detail in the following non-limiting description of two embodiments according to the invention, in connection with the accompanying drawings, among which:

FIGS. 1a to 1g comprise simplified views illustrating different steps of a first method according to the invention, FIGS. 2a to 2f comprise simplified views illustrating different steps of a second method according to the invention, FIG. 3 is a graph illustrating a normalized profile of the optical field centered on the dielectric layer belonging to an optical waveguide according to the invention, the axis of abscissas being in micrometers.

For the different embodiments, the same references will be used for identical elements or elements performing the same function, to simplify the description.

The first method illustrated in FIGS. 1a to 1g is a method of manufacturing an optical waveguide 1 comprising two crystalline semiconductor regions 10, 11 separated by a dielectric layer 2, such as shown in FIG. 1g. As shown in FIG. 1g, dielectric layer 2 has a predetermined width l and a predetermined thickness e strictly greater than said width l; e>l.

As illustrated in FIG. 1a, the first method comprises a step a) of providing a substrate 3 successively comprising a support substrate 32, an electric insulator layer 30, and a crystalline semiconductor layer 31. Substrate 3 has a planar surface 310. Planar surface 310 of substrate 3 corresponds to the free surface of semiconductor layer 31. Semiconductor layer 31 advantageously has a thickness E equal to predetermined thickness e of dielectric layer 2.

"Width" means a dimension along an axis X'-X parallel to the plane defined by planar surface 310 of substrate 3.

"Thickness" means a dimension along an axis Z'-Z perpendicular to planar surface 310 of substrate 3.

Semiconductor layer 31 is advantageously a single-crystal layer, preferably based on single-crystal silicon.

As illustrated in FIG. 1c, the first method comprises a step b) of forming a trench 4 in semiconductor layer 31 to expose electric insulator layer 30 and define first and second semiconductor areas 40, 41 on either side of exposed electric insulator layer 300. Step b) comprises a prior step illustrated in FIG. 1b comprising arranging an etch mask 5 on semiconductor layer 31 to protect first semiconductor area 40. Etch mask 5 preferably comprises a hard mask layer 51 arranged on semiconductor layer 31 and a layer 50 based on resist topping hard mask layer 51. However, etch mask 5 may be formed of a single resist-based layer 50 or of a single hard mask layer 51.

Step b) is executed so that first semiconductor area 40 has a lateral edge 400 extending across the entire thickness E of semiconductor layer 31 and along an axis Z'-Z perpendicular to planar surface 310 of substrate 3.

"Perpendicular" means that the angle formed between lateral edge 400 and planar surface 310 of substrate 3 is in the range from 85° to 95°.

First semiconductor area 40 is intended to form first semiconductor region 10 of optical waveguide 1. The trench formed at step b) is configured so that second semiconductor area 41 forms a seed layer extending across a thickness $e_0$ smaller than thickness E of semiconductor layer 31.

Step b) is executed by an etching of semiconductor layer 31 capable of forming the seed layer and a portion of lateral edge 400 of the first conductive area 40. The etching comprises an overetching of semiconductor layer 31 capable of exposing electric insulator layer 30 and defining the seed layer of first semiconductor area 40. The overetching ends the forming of lateral edge 400 of first semiconductor area 40.

Width $l_0$ of exposed electric insulator layer 300 obtained after step b) is preferably in the range from 10 nm to 50 nm. Thickness $e_0$ of the seed layer obtained after step b) is preferably in the range from 10 nm to 70 nm.

Step b) is advantageously executed by a reactive ion etching of semiconductor layer 31 capable of favoring an anisotropic etching. The overetching of semiconductor layer 31 is obtained by an oblique incidence of an ion flow. "Oblique" means a direction which is not parallel to axis Z'-Z. More specifically, the topography of the etched object results in an oblique incidence of an ion flow on an area of lateral edge 400 of first semiconductor area 40 and/or on an area of the side of etch mask 5. The area of lateral edge 400 of first semiconductor area and/or the area of the side of etch mask 5 deviates the incident ion flow. This results in a concentration of the ion flow appearing at the foot of lateral edge 400 of first semiconductor area 40.

The reactive ion etching is preferably executed inside of a chamber comprising:
an upper electrode coupled to a first radio signal generator—RF—, called upper generator,
a lower electrode coupled to a second RF signal generator, called lower generator, substrate 3 being intended to rest on the lower electrode.

The anisotropy of the etching is favored, for example, by the selection of the respective power of the upper generator and of the lower generator, noted Psup and Pinf. Thus, the upper generator has a high power as compared with the power of the lower generator, preferably Psup>3 Pinf. As an example, Pinf<120 W and Psup>400 W, preferably Pinf=100 W and Psup=500 W. The pressure within the chamber may be lower than 50 mTorr, preferably lower than 10 mTorr. The reactive gases introduced into the chamber are advantageously selected from the group comprising $Cl_2$, HBr, $O_2$He, and $CF_4$.

The trench formed by the overetching may be obtained by a high $Cl_2$/HBr ratio and a low pressure within the chamber. As an example, the $Cl_2$/HBr ratio is advantageously in the order of 3:1, and the pressure within the chamber is in the order of 4 mTorr. As an example, the reactive gas flows (in sccm) for $Cl_2$, HBr, $O_2$He, and $CF_4$ are respectively in the order of 150, 50, 5, and 10. The trench formed by the overetching then has a depth in the order of 40 nm, which corresponds to thickness $e_0$ of the seed layer obtained after step b). The ratio of thickness $e_0$ of the seed layer obtained after step b) to width $l_0$ of exposed electric insulator layer 300 obtained after step b) is in the order of 1.

The thickness of hard mask layer 51 to be etched is predetermined particularly according to thickness E of semiconductor layer 31 and to the etch speed difference between layer 51 and semiconductor layer 31.

As illustrated in FIG. 1d, the first method comprises a step c) of forming dielectric layer 2 of predetermined width l across the entire thickness E of lateral edge 400. Step c) is executed by a thermal oxidation of lateral edge 400. As an example, when semiconductor layer 31 is based on single-crystal silicon, step c) is executed:
at a temperature in the range from 800° C. to 1,200° C., preferably at 1,000° C.,
preferably in the presence of water vapor.

This results in the forming of a dielectric layer 2 based on $SiO_2$. Further, a $SiO_2$ layer is formed around seed layer 41, as shown in FIG. 1d. As shown in FIG. 1e, the $SiO_2$ layer formed around seed layer 41 is removed before step d) described hereafter, preferably by anisotropic etching.

It will be within the abilities of those skilled in the art to determine the duration of execution of step c) according to the desired width l of dielectric layer 2.

Further, since the thermal oxidation also consumes the crystalline material of the seed layer, the trench formed at step b) is previously configured so that the thickness of the seed layer after step c) is sufficient for an epitaxial growth.

According to an alternative execution, step c) is executed by conformal deposition of dielectric layer 2 on lateral edge 400. The conformal deposition preferably is an atomic layer deposition—ALD—or a plasma-enhanced chemical vapor deposition—PECVD—. As an example, when semiconductor layer 31 is based on single-crystal silicon, step c) is advantageously executed by a PECVD of $SiO_2$ at a temperature in the range from 350° C. to 400° C. with a tetraethyl orthosilicate—TEOS—source.

The trench formed at step b) is then previously configured so that second semiconductor area 41 forms a seed layer extending across a thickness $e_0$ smaller than 1.5 time width $l_0$ of exposed electric insulator layer 300; $e_0<1.5\ l_0$.

The first method comprises a step d) of forming by epitaxy second semiconductor region 11 of optical waveguide 1 from seed layer 41. Advantageously, the epitaxy of step d) is selective to avoid a growth from exposed electric insulator layer 300. Step d) is executed after step c).

As illustrated in FIG. 1g, step d) advantageously comprises a chem.-mech. polishing step capable of making second semiconductor region 11 coplanar to dielectric layer 2 and to first semiconductor region 10. Hard mask layer 51 enables to protect first semiconductor area 40 from the chem.-mech. polishing.

The first method advantageously comprises a step (not shown) of electrically doping first and second semiconductor regions 10, 11 so that optical waveguide 1 forms a capacitance.

The ratio of thickness e to width l of dielectric layer 2 of the obtained optical waveguide 1 is advantageously greater than 1.5. Advantageously, width l of dielectric layer 2 is smaller than or equal to 50 nm and greater than or equal to 5 nm. Preferably, width l of dielectric layer 2 is in the range from 10 nm to 20 nm. Advantageously, the ratio of thickness e to width l of dielectric layer 2 is in the range from 17 to 50, preferably from 20 to 50, preferably still from 20 to 30.

As shown in FIG. 3, as an example with a width l equal to 10 nm and a ratio equal to 22, it can be observed that, despite the strong confinement of the optical field in the dielectric layer 2, the overlapping of the small fraction of the optical field present close to dielectric layer 2 with the charge carrier storage area remains sufficient to ensure the electro-refraction phenomenon.

The second method illustrated in FIGS. 2a to 2e is a method of manufacturing an optical waveguide 1 comprising two crystalline semiconductor regions 10, 11 separated by a dielectric layer 2, such as shown in FIG. 2f. As shown in FIG. 2f, dielectric layer 2 has a predetermined width l and a predetermined thickness e strictly greater than said width l; e>l.

The second method comprises a step a) of providing a substrate 3 successively comprising a support substrate 32, an electric insulator layer 30, and a crystalline semiconductor layer. Substrate 3 has a planar surface 310. Support substrate 32 is based on a crystalline semiconductor material. Support substrate 32 is advantageously a single-crystal substrate, preferably based on single-crystal silicon. The semiconductor layer advantageously has a thickness E equal to predetermined thickness e of dielectric layer 2.

"Width" means a dimension along an axis X'-X parallel to the plane defined by planar surface 310 of substrate 3.

"Thickness" means a dimension along an axis Z'-Z perpendicular to planar surface 310 of substrate 3.

The semiconductor layer is advantageously a single-crystal layer, preferably based on single-crystal silicon.

As illustrated in FIG. 2a, the second method comprises a step b) of removing a portion 4 of the semiconductor layer to expose electric insulator layer 30 and define a single semiconductor area 40 on one side of exposed electric insulator layer 300. Step b) comprises a previous step (not shown) comprising arranging an etch mask on the semiconductor layer to protect semiconductor area 40. The etch mask preferably comprises a hard mask layer 51 arranged on the semiconductor layer and a resist-based layer topping hard mask layer 51.

As shown in FIG. 2a, step b) is executed so that semiconductor area 40 has a lateral edge 400 extending across the entire thickness E of the semiconductor layer and along an axis perpendicular to planar surface 310 of substrate 3.

"Perpendicular" means that the angle formed between lateral edge 400 and planar surface 310 of substrate 3 is in the range from 85° to 95°.

Semiconductor area 40 is intended to form first semiconductor region 10 of optical waveguide 1. Step b) is advantageously executed by anisotropic etching, such as a plasma etching capable of forming lateral edge 400 of semiconductor area 40.

As illustrated in FIG. 2b, the second method comprises a step c) of forming dielectric layer 2 of predetermined width l across the entire thickness E of lateral edge 400. Step c) is executed by a thermal oxidation of lateral edge 400. As an example, when the semiconductor layer is based on single-crystal silicon, step c) is executed:

at a temperature in the range from 800° C. to 1,200° C., preferably at 1,000° C., preferably in the presence of water vapor.

This results in the forming of a dielectric layer 2 based on $SiO_2$.

It will be within the abilities of those skilled in the art to determine the duration of execution of step c) according to the desired width l of dielectric layer 2.

According to an alternative execution, step c) is executed by conformal deposition of dielectric layer 2 on lateral edge 400. The conformal deposition preferably is an atomic layer deposition—ALD—or a plasma-enhanced chemical vapor deposition—PECVD—. As an example, when the semiconductor layer is based on single-crystal silicon, step c) is advantageously executed by PECVD of $SiO_2$ at a temperature in the range from 350° C. to 400° C. with a tetraethyl orthosilicate—TEOS—source.

As illustrated in FIG. 2c, the second method comprises a step of photolithography of a resin 6 defining openings 60 emerging onto exposed electric insulator layer 300.

As illustrated in FIG. 2d, the second method comprises a step c1) of forming at least trenches 7 in exposed electric insulator layer 300 to expose support substrate 32. Trenches 7 are formed in alignment with openings 60. Step c1) is advantageously executed by an anisotropic etching, such as a plasma etching. Resin 6 is then removed.

As illustrated in FIG. 2e, the second method comprises a step d) of forming by epitaxy second semiconductor region 11 of optical waveguide 1 from exposed support substrate 32. Advantageously, the epitaxy of step d) is selective to avoid a growth from electric insulator layer 30. Step d) is executed after step c).

As illustrated in FIG. 2f, step d) comprises a chem.-mech. polishing step capable of making second semiconductor region 11 coplanar to dielectric layer 2 and to first semiconductor region 10.

The second method advantageously comprises a step (not shown) of electrically doping first and second semiconductor regions 10, 11 so that optical waveguide 1 forms a capacitance.

The ratio of thickness e to width l of dielectric layer 2 of the obtained optical waveguide 1 is advantageously greater than 1.5. Advantageously, width l of dielectric layer 2 is smaller than or equal to 50 nm and greater than or equal to 5 nm. Preferably, width l of dielectric layer 2 is in the range from 10 nm to 20 nm. Advantageously, the ratio of thickness e to width l of dielectric layer 2 is in the range from 17 to 50, preferably from 20 to 50, preferably still from 20 to 30.

As shown in FIG. 3, as an example with a width l equal to 10 nm and a ratio equal to 22, it can be observed that, despite the strong confinement of the optical field in dielectric layer 2, the overlapping of the small fraction of the optical field present close to dielectric layer 2 with the charge carrier storage area remains sufficient to ensure the electro-refraction phenomenon.

The invention claimed is:

1. Method of manufacturing an optical waveguide comprising two crystalline semiconductor regions separated by a dielectric layer, the dielectric layer having a predetermined width and a predetermined thickness greater than said width, the method comprising the steps of:
   a) providing a substrate successively comprising an electric insulator layer and a crystalline semiconductor layer, the substrate having a planar surface;
   b) forming a trench in the semiconductor layer to expose the electric insulator layer and defining first and second semiconductor areas on either side of the exposed electric insulator layer, step b) being executed so that the first semiconductor area has a lateral edge extending across the entire thickness of the semiconductor layer and along an axis perpendicular to the planar surface of the substrate, the first semiconductor area being intended to form the first semiconductor region of the optical waveguide;
   c) forming the dielectric layer with the predetermined width across the entire thickness of the lateral edge;
wherein the trench formed at step b) is configured so that the second semiconductor area forms a seed layer extending across a thickness smaller than the thickness of the semiconductor layer; and
   wherein the method comprises a step of d) forming by epitaxy the second semiconductor region of the optical waveguide from the seed layer, step d) being executed after step c).

2. Method according to claim 1, wherein step b) is executed by an etching of the semiconductor layer capable of forming the seed layer and a portion of the lateral edge of the first semiconductor area, said etching comprising an overetching of the semiconductor layer capable of exposing the electric insulator layer and defining the seed layer of the first semiconductor area, the overetching ending the forming of the lateral edge of the first semiconductor area.

3. Method according to claim 2, wherein the etching of the semiconductor layer is a reactive ion etching capable of favoring an anisotropic etching, the overetching of the semiconductor layer being obtained by an oblique incidence of an ion flow.

4. Method according to claim 1, wherein step c) is executed by a thermal oxidation of the lateral edge.

5. Method according to claim 1, wherein step c) is executed by conformal deposition of the dielectric layer on the lateral edge, by atomic layer deposition or by plasma-enhanced chemical vapor deposition.

6. Method according to claim 1, wherein step d) comprises a chemical-mechanical polishing step capable of making the second semiconductor region coplanar with the dielectric layer and with the first semiconductor region.

7. Method according to claim 1, wherein the semiconductor layer is a single-crystal layer.

8. Method of claim 1, wherein the semiconductor layer has a thickness equal to the predetermined thickness of the dielectric layer.

9. Method according to claim 1, wherein it comprises a step of electrically doping the first and second semiconductor regions so that the optical waveguide forms a capacitance.

10. Method according to claim 1, wherein the ratio of the thickness to the width of the dielectric layer formed at step c) is greater than 1.5.

11. Optical waveguide capable of being obtained by the method according to claim 10.

12. Electro-optical modulator comprising an optical waveguide according to claim 11.

13. Optical waveguide for an electro-optical modulator of capacitive type, comprising two electrically-doped crystalline semiconductor regions separated by a dielectric layer, the dielectric layer having a predetermined width and a predetermined thickness greater than said width, made by the method of claim 1,
   wherein the width is smaller than or equal to 50 nm and greater than or equal to 4 nm; and
   wherein the ratio of the thickness to the width is in the range from 17 to 50.

14. Optical waveguide according to claim 13, wherein the width of the dielectric layer is in the range from 4 nm to 20 nm.

15. Method of manufacturing an optical waveguide comprising two crystalline semiconductor regions separated by a dielectric layer, the dielectric layer having a predetermined width and a predetermined thickness greater than said width, the method comprising the steps of:
   a) providing a substrate successively comprising an electric insulator layer and a crystalline semiconductor layer, the substrate having a planar surface, the substrate being based on a crystalline semiconductor material;
   b) removing a portion of the semiconductor layer to expose the electric insulator layer and define a single semiconductor area on one side of the exposed electric insulator layer, step b) being executed so that the semiconductor area has a lateral edge extending across the entire thickness of the semiconductor layer and along an axis perpendicular to the planar surface of the substrate, the semiconductor area being intended to form the first semiconductor region of the optical waveguide;
   c) forming the dielectric layer with the predetermined width across the entire thickness of the lateral edge;
   c1) forming at least one trench in the exposed electric insulator layer to expose the substrate;
   d) forming by epitaxy the second semiconductor region of the optical waveguide from the exposed substrate, step d) being executed after step c).

16. Method according to claim 15, wherein step b) is executed by an anisotropic etching, such as a reactive ion etching, capable of forming the lateral edge of the semiconductor area.

* * * * *